United States Patent
Hsieh et al.

(10) Patent No.: US 9,612,824 B2
(45) Date of Patent: Apr. 4, 2017

(54) FIRMWARE VARIABLE UPDATE METHOD

(71) Applicant: Wistron Corporation, New Taipei (TW)

(72) Inventors: Min-Hua Hsieh, New Taipei (TW); Chun-Chang Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/733,956

(22) Filed: Jun. 8, 2015

(65) Prior Publication Data

US 2016/0179500 A1 Jun. 23, 2016

(30) Foreign Application Priority Data

Dec. 17, 2014 (TW) .............................. 103144142 A

(51) Int. Cl.
*G06F 9/44* (2006.01)
*G06F 9/445* (2006.01)
*G06F 11/14* (2006.01)

(52) U.S. Cl.
CPC .............. *G06F 8/665* (2013.01); *G06F 8/68* (2013.01); *G06F 8/71* (2013.01); *G06F 11/1433* (2013.01)

(58) Field of Classification Search
CPC ........... G06F 8/68; G06F 8/71; G06F 11/1433
USPC ................................ 717/168, 169, 174, 175
See application file for complete search history.

(56) References Cited

U.S. PATENT DOCUMENTS

| | | | | |
|---|---|---|---|---|
| 5,333,285 A | * | 7/1994 | Drerup | G06F 11/1415 714/23 |
| 6,907,524 B1 | * | 6/2005 | Huntington, II | G06F 21/575 380/28 |
| 2004/0076043 A1 | * | 4/2004 | Boals | G06F 11/1417 365/200 |
| 2004/0193865 A1 | * | 9/2004 | Nguyen | G06F 9/4401 713/2 |

(Continued)

OTHER PUBLICATIONS

Windows UEFI Firmware Update Platform, Published by Microsoft, Apr. 2013.*

(Continued)

*Primary Examiner* — Wei Zhen
*Assistant Examiner* — Hossain Morshed
(74) *Attorney, Agent, or Firm* — Winston Hsu; Scott Margo

(57) ABSTRACT

A firmware variable update method for BIOS of a computer system is provided. The firmware variable update method includes writing an update capsule file and a firmware update command into a memory according to a first system management interrupt signal and performing a shutdown process, triggering a second system management interrupt signal and accordingly writing a variable update command into the memory, switching the computer system into a sleep state before the shutdown process is completed and activating a timer, performing a first reboot process when the timer expires, utilizing the update capsule file to update an original capsule file of the BIOS according to the firmware update command during the first reboot process, and performing a second reboot process and utilizing an update variable file to update an original variable file of the BIOS according to the variable update command during the second reboot process.

10 Claims, 4 Drawing Sheets

(56) References Cited

U.S. PATENT DOCUMENTS

| | | | | |
|---|---|---|---|---|
| 2004/0230963 | A1* | 11/2004 | Rothman | G06F 8/65 717/168 |
| 2004/0255286 | A1* | 12/2004 | Rothman | G06F 8/65 717/168 |
| 2005/0027954 | A1* | 2/2005 | Rothman | G06F 12/0246 711/159 |
| 2007/0043833 | A1* | 2/2007 | Lu | H04L 67/34 709/219 |
| 2009/0006834 | A1* | 1/2009 | Rothman | G06F 8/65 713/2 |
| 2009/0172253 | A1* | 7/2009 | Rothman | G06F 12/0246 711/103 |
| 2011/0072254 | A1* | 3/2011 | Kuang | G06F 9/4403 713/2 |
| 2014/0040605 | A1* | 2/2014 | Futral | G06F 9/445 713/2 |
| 2014/0189336 | A1* | 7/2014 | Ballesteros | G06F 21/575 713/2 |
| 2014/0258699 | A1* | 9/2014 | Hsu | G06F 11/1417 713/2 |
| 2015/0089209 | A1* | 3/2015 | Jacobs | G06F 21/575 713/1 |
| 2015/0128249 | A1* | 5/2015 | Alexandrian | G06F 21/629 726/16 |
| 2016/0112252 | A1* | 4/2016 | Notari | H04L 41/0843 709/221 |

OTHER PUBLICATIONS

Intel—PEI Overview—2009, Published by Intel Corp., 2009.*
Windows—UEFI—Firmware—Update—Platform—p. 42—2009, Published by Microsoft, 2013.*

* cited by examiner

| Offset | Value | Field (version BIOS#63) | Field (version BIOS#64 updated by using the conventional method) | Field (version BIOS#64 updated by using the method of the invention) |
|---|---|---|---|---|
| [39h] | 00h | Variable 1 | New variable 1 | New variable 1 |
| [3Ah] | 01h | Variable 2 | New variable 2 | New variable 2 |
| [3Bh] | 01h | Variable 3 (Variable value = 1) (RAID) | Variable 1 | Variable 1 |
| [3Ch] | 02h | Variable 4 (Variable value = 2) (RAID) | Variable 2 | Variable 2 |
| [3Dh] | 01h | Variable 5 (Variable value = 1) (AHCI) | Variable 3 (Variable value = 1) (RAID) | Variable 3 (Variable value = 1) (RAID) |
| [3Eh] | 00h | N/A (Initial value = 0) | Variable 4 (Variable value = 0) (RAID) | Variable 4 (Variable value = 2) (RAID) |
| [3Fh] | 00h | N/A (Initial value = 0) | Variable 5 (Variable value = 0) (RAID) | Variable 5 (Variable value = 1) (AHCI) |

FIG. 4

FIRMWARE VARIABLE UPDATE METHOD

BACKGROUND OF THE INVENTION

1. Field of the Invention

The present invention relates to a firmware variable update method and more particularly, to a firmware variable update method capable of updating firmware variable according to requirements.

2. Description of the Prior Art

A basic input/output system (BIOS) plays a very important role in the functioning of a computer system during boot-up. In general, through the BIOS, hardware configurations of all components can be initialized and the computer system can load the OS successfully during boot-up. BIOS code is usually stored in a storage device in practice. As the computer system provides system power to a central processing unit, the processor further accesses and executes the BIOS code stored in the storage device in order to perform a boot process for the computer system.

Since the computer system architecture updates quickly, the BIOS must be updated frequently for the latest hardware architectures. The BIOS code usually includes a capsule file and a variable file. Parameters stored in the variable file can be used for system initialization, parameter passing for device and status recording. However, the variable file of the BIOS is not updated during a conventional firmware updating process. Instead, the original variable value setting is retained in the variable file. Thus, when the BIOS versions are subject to change, the variable value in the variable file would be wrong, resulting in image file broken and boot failure.

SUMMARY OF THE INVENTION

It is therefore an objective of the present invention to provide a firmware variable update method capable of updating firmware variable according to requirements.

The present invention discloses a firmware variable update method, for a Basic Input/Output System (BIOS) of a computer system, comprising: writing an update capsule file and a firmware update command into a memory according to a first system management interrupt signal and performing a shutdown process, wherein the firmware update command is utilized for indicating performing a capsule file updating process; triggering a second system management interrupt signal and accordingly writing a variable update command into the memory, wherein the variable update command is utilized for indicating performing a firmware variable updating process; switching the computer system into a sleep state before the shutdown process is completed and activating a timer; performing a first reboot process when the timer expires; utilizing the update capsule file to update an original capsule file of the BIOS according to the firmware update command during the first reboot process; and performing a second reboot process and utilizing an update variable file to update an original variable file of the BIOS according to the variable update command during the second reboot process.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a schematic diagram of the variable file of the BIOS according to an embodiment of the invention.

DETAILED DESCRIPTION

Figure 1:
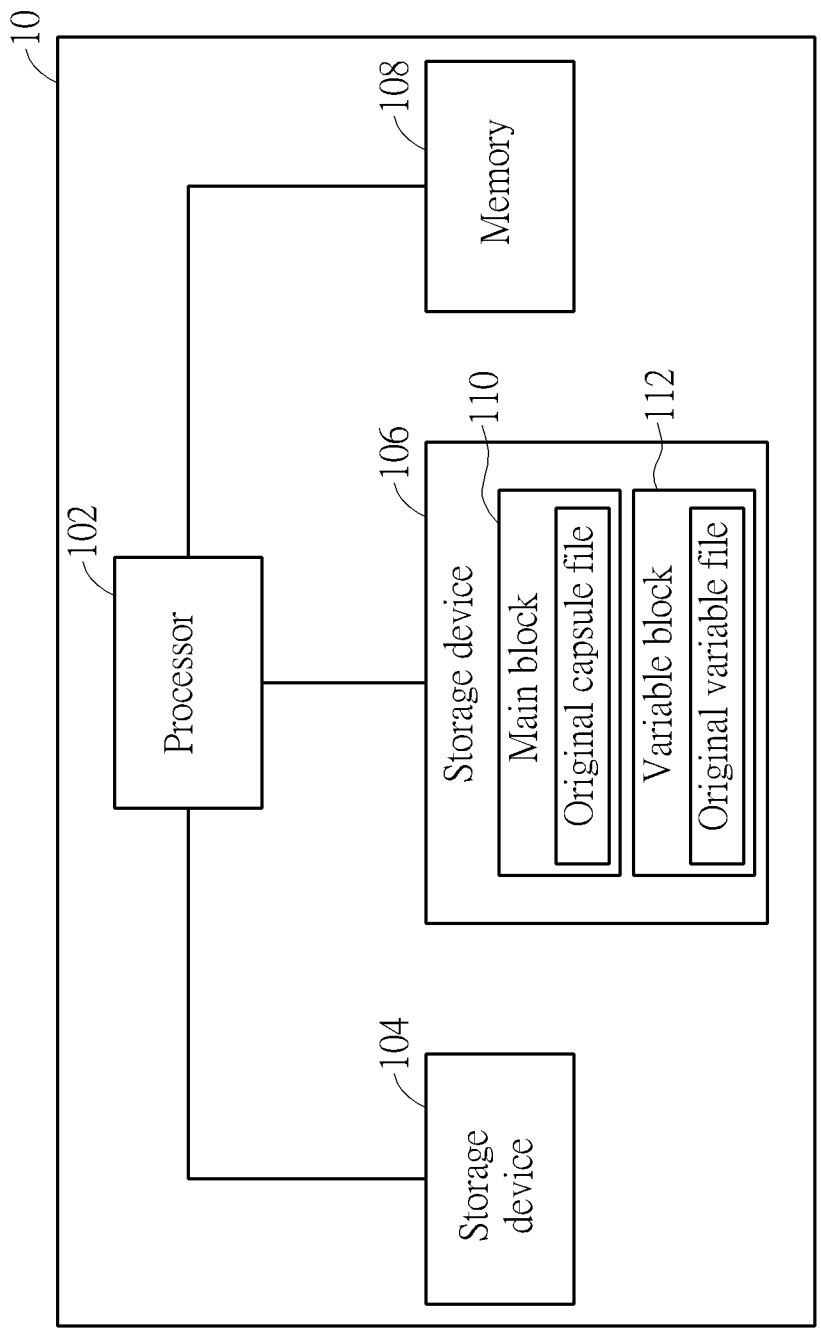
FIG. 1 is a schematic diagram of a computer system according to an embodiment of the invention.

Please refer to FIG. 1, which is a schematic diagram of a computer system 10 according to an embodiment of the invention. The computer system 10 includes a processor 102 and storage devices 104, 106 and a memory 108. The storage device 104 is coupled to the processor 102 for storing data being accessed and executed by the processor 102. For example, the data can be loaded into the storage device 104 and the processor 102 accesses the data in the storage device 104 for executing related processes. The storage device 106 is utilized for storing BIOS. The storage device 106 includes a main block 110 and a variable block 112. The main block 110 is utilized for storing an original capsule file of the BIOS. The block 112 is utilized for storing an original variable file of the BIOS.

The storage devices 104 and 106 can be any kind of storage devices which can be read and/or written. For example, the storage device 104 can be a random access memory (RAM). The storage device 106 can be a non-volatile memory, such as a flash read only memory (Flash ROM). The storage device 106 can be an electrically erasable programmable read only memory (EEPROM), but this should not be a limitation of the invention. The memory 108 can be a physical memory and retains power in an S3 sleep mode of an advanced configuration and power interface (ACPI).

Figure 2:
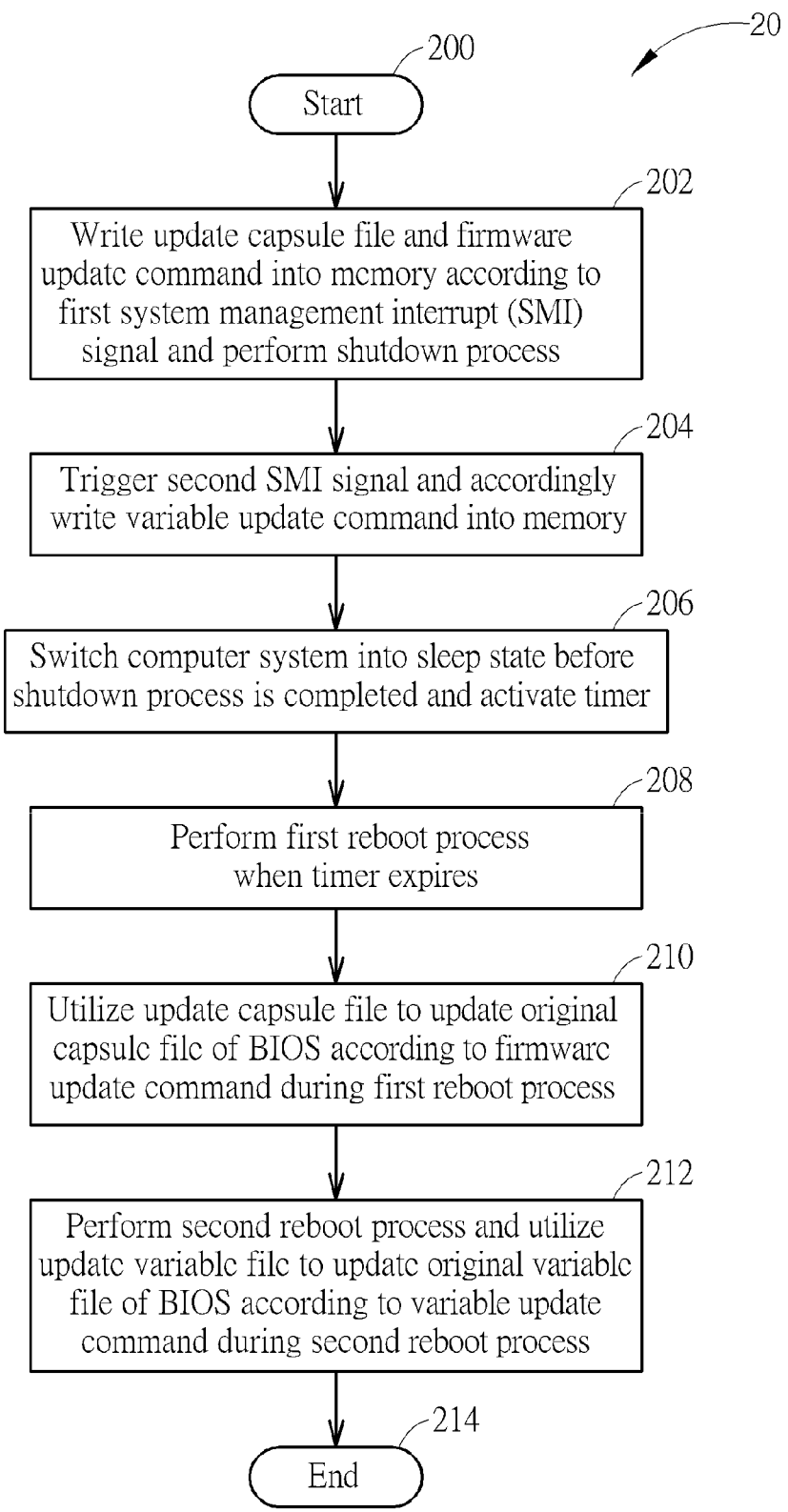
FIG. 2 is a flow diagram of a procedure for firmware variable update of the BIOS according to an embodiment of the invention.

For an illustration of operations of the computer system 10, please refer to FIG. 2. FIG. 2 is a flow diagram of a procedure 20 for firmware variable update of the BIOS according to an embodiment of the present invention. The flow diagram in FIG. 2 mainly corresponds to the operations on the computer system 10 shown in FIG. 1. The procedure 20 includes the following steps:

Step 200: Start.

Step 202: Write update capsule file and firmware update command into memory according to first system management interrupt (SMI) signal and perform shutdown process.

Step 204: Trigger second SMI signal and accordingly write variable update command into memory.

Step 206: Switch computer system into sleep state before shutdown process is completed and activate timer.

Step 208: Perform first reboot process when timer expires.

Step 210: Utilize update capsule file to update original capsule file of BIOS according to firmware update command during first reboot process.

Step 212: Perform second reboot process and utilize update variable file to update original variable file of BIOS according to variable update command during second reboot process.

Step 214: End.

According to the procedure 20, in Step 202, an update capsule file and a firmware update command are written into the memory 108 according to a first SMI signal and a shutdown process is performed. The first SMI signal can be a software SMI signal. The firmware update command indicates performing a capsule file updating process. For example, in this embodiment, the BIOS can trigger the first SMI signal to allow the processor 102 enters a system management mode (SMM). The update capsule file and the firmware update command can be written into the memory 108 accordingly. After the update capsule file and the firmware update command are written into the memory 108, the computer system 10 performs a shutdown process and a power state of the computer system 10 is switched into an off mode, e.g. an S5 off mode of ACPI.

In this embodiment, the computer system 10 can verify the validity of the update capsule file and perform following updating process. Please refer to FIG. 3. An update application program, e.g. a Winflash burning application program, is executed. The update application program is utilized to check whether the update capsule file is a valid firmware file (Step 302 and Step 304). If the checking result indicates the update capsule file is a valid firmware file, the first SMI signal is triggered (Step 306). Therefore, the processor 102 enters a system management mode and writes the update capsule file and the firmware update command into the memory 108 according to the first SMI signal (Step 310). The computer system 10 begins to perform a shutdown process and a power state of the computer system 10 is switched into an S5 off mode (Step 312). Besides, if the checking result indicates the update capsule file is an invalid firmware file, the flow goes to Step 308, the updating process stops.

In Step 204, before the shutdown process of Step 202 is completed, a variable update command is written into the memory 108 according to a second SMI signal. The variable update command indicates performing a firmware variable updating process. The second SMI signal can be a sleep trap SMI signal. For example, in this embodiment, the BIOS can trigger a second SMI signal to allow the processor 102 enter the system management mode. The variable update command can be written into the memory 108 accordingly.

Figure 3:
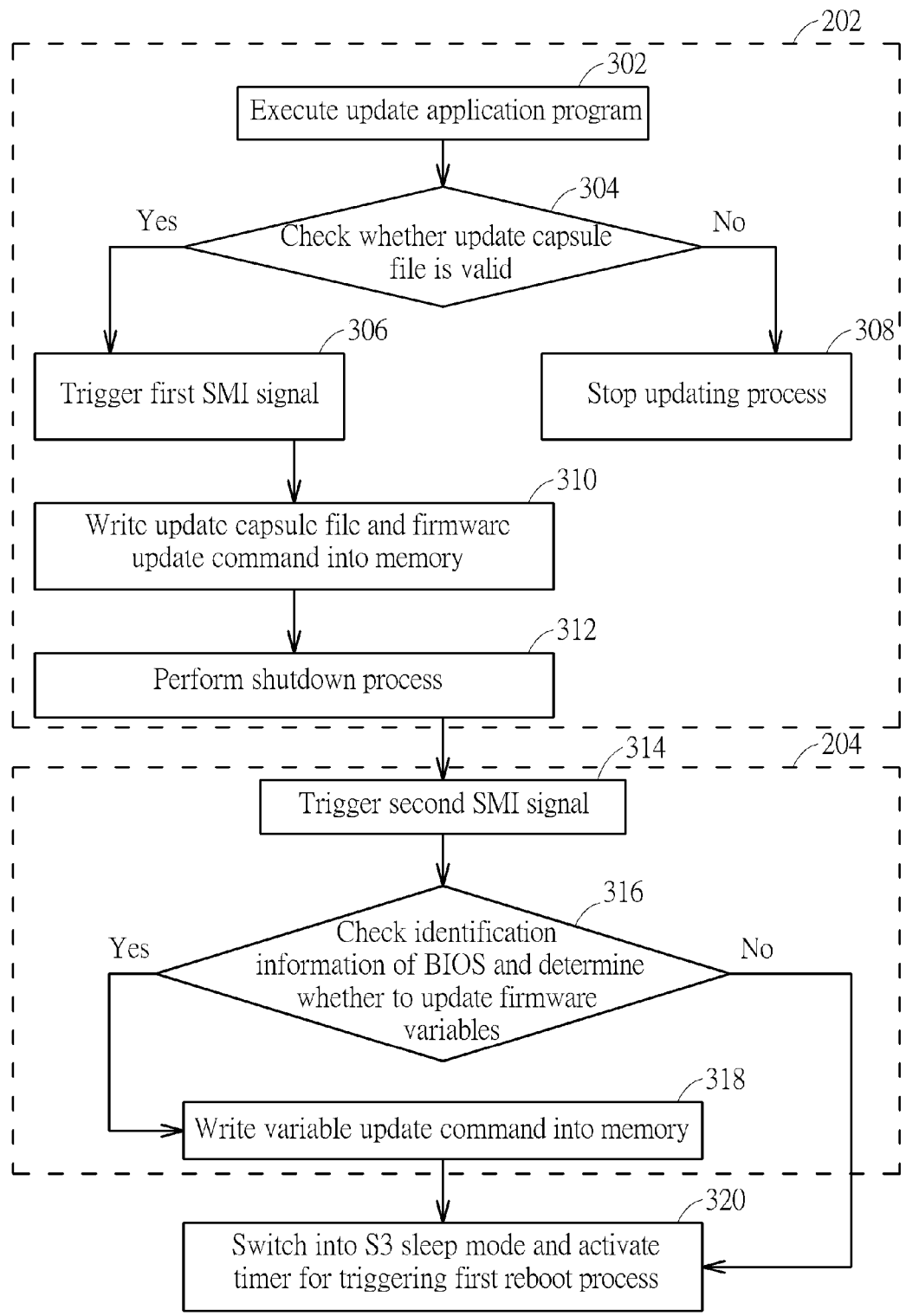
FIG. 3 is a schematic diagram of an alternative embodiment of the procedure for firmware variable update shown in FIG. 2.

As to operations of writing the variable update command into the memory 108, please further refer to FIG. 3. Before the shutdown process of Step 202 is completed, the BIOS triggers a second SMI signal to allow the processor 102 enter the system management mode (Step 314). The processor 102 checks identification information of the BIOS and accordingly determines whether to update firmware variables so as to generate a determination result (Step 316). The identification information includes at least one of version information, a build date and a product type of the BIOS. If the determination result indicates that the firmware variables need to be updated, the variable update command is written into the memory 108 (Step 318). If the determination result indicates that the firmware variables do not need to be updated, the variable update command will not be written into the memory 108.

In Step 206, before the shutdown process of Step 202 is completed, the computer system 10 is switched into an S3 sleep mode and activates a timer for triggering the following first reboot process, e.g. Step 320 shown in FIG. 3. When the computer system 10 is in the S3 sleep mode of ACPI, the memory 108 retains power from the computer system 10 and can operate normally. Under such a situation, when the computer system 10 is switched into an S3 sleep mode, the update capsule file, the firmware update command and the variable update command stored in the memory will not be lost since the memory 108 can operate normally. In addition, the period length of the timer can be adjusted according to different requirements. The timer can be a real time clock (RTC) wakeup timer, and this should not be a limitation of the invention.

In Step 208, when the timer activated in Step 206 expires, the computer system 10 performs a first reboot process. In other word, the timer is used for waking up the computer system 10 to perform the first reboot process.

In Step 210, the original capsule file of the BIOS can be updated according to the firmware update command during the first reboot process. For example, the processor 102 detects whether the memory 108 stores the firmware update command during a pre-EFI initialization environment (PEI) phase of the first reboot process. If the firmware update command is detected in the memory 108, this means that the computer system requires performing a capsule file updating process. A boot mode of the BIOS is set into an update mode according to the firmware update command. After that, the firmware update command stored in the memory 108 is erased. An update driver can be loaded during a boot device select (BDS) phase of the first reboot process since the BIOS is set into the update mode. The update driver utilizes the update capsule file to update the original capsule file stored in the main block 110. For example, the update driver utilizes the update capsule file to overwrite the original capsule file stored in the main block 110. In other words, the update driver may erase the original capsule file stored in the main block 110 and write the update capsule file into the main block 110, i.e. the update capsule file replaces the original capsule file, for implementing the capsule file updating process.

In Step 212, when the update capsule file has been written into the main block 110, the computer system 10 performs a second reboot process. The processor 102 detects whether the memory 108 stores the variable update command during the second reboot process. If the variable update command is detected in the memory 108, this means that the computer system requires performing a firmware variable updating process. An update variable file is utilized to update the original variable file stored in variable block 112 according to variable update command. For example, the update variable file is utilized to overwrite the original variable file stored in the variable block 112. That is, the update driver may erase the original variable file stored in the variable block 112 and write the update variable file into the variable block 112, i.e. the update variable file replaces the original variable file, for implementing the variable updating process. When the variable updating process, the computer system 10 deletes the variable update command stored in the memory 108 and performs a normal boot process for normal operation. Since the update capsule file replaces the original capsule file in Step 210 and the original variable file still retains original settings, the invention can perform the variable update process during the second reboot process so as to avoid unexpected error.

In addition, in Step 212, if there is no variable update command being detected in the memory 108, this means the firmware variables do not need to be updated. Under such a situation, the computer system 10 performs a normal boot process.

Since the firmware variables (e.g. the original variable file stored in the variable block 112 shown in FIG. 1) of the BIOS may be not updated during a conventional firmware updating process, the invention stores the update capsule file, the firmware update command and the variable update command into the memory 108 through the SMI signals and further changes the computer system 10 into the S3 sleep mode of the ACPI, so that the memory 108 can retain power for normal operation. Therefore, the update capsule file, the firmware update command and the variable update command will not loss and can be used in the following updating process. After that, the computer system 10 updates the original capsule file of the main block 110 and the original variable file of the variable block 112 according to the firmware update command and the variable update command stored in the memory 108 so as to add or delete firmware variables according different requirements. Besides, since the original capsule file is updated with the update capsule file in Step 210 and the original variable file still retains original settings, the invention can perform the variable update process during the second reboot process so as to avoid unexpected error.

Please refer to FIG. 4, which is a schematic diagram of the variable file of the BIOS according to an embodiment of the invention. The variable file content of version BIOS#63, the variable file content of version BIOS#64 (updated by using the conventional method), the variable file content of version BIOS#64 (updated by using the method of the invention) are shown in FIG. 4, respectively. Compared with the version BIOS#63, a new variable 1 and a new variable 2 is added in the version BIOS#64. The Offset address of the new variable 1 is 0x39h. The offset address of the new variable 2 is 0x3Ah. Under such a situation, the variable originally allocated at 0x39h would move forward two offsets. However, the conventional method does not update the variable file and does retain the original setting. For example, referring to the version BIOS#64 updated by using the conventional method, the offset address of the variable 1 is at 0x3Bh. A variable value of the variable 1 continues to use a value originally stored at offset 0x3Bh. That is, the variable value (variable value=1) of the variable 3 of the version BIOS#63 is adopted for acting as the variable value of the variable 1 of the version BIOS#64 (updated by using the conventional method), the variable value (variable value=1) of the variable 5 of the version BIOS#63 is adopted for acting as the variable value of the variable 3 of the version BIOS#64 updated by using the conventional method, and such like this. Since the variable contents at offsets 0x3Eh and 0x3Fh of the version BIOS#63 are undefined, i.e. initial value is zero, the variable value of the variable 4 of the version BIOS#64 updated by using the conventional method would change from 2 to zero after updated. Similarly, the variable value of the variable 5 of the version BIOS#64 updated by using the conventional method would change from 1 to zero. The system setting is changed from a redundant array of independent disks (RAID) mode to an advanced host controller interface (AHCI) mode. Thus, after updated by using the conventional method, the image file is broken resulting in boot failure.

In comparison, the invention can reconstruct a correct update variable file and update the update variable file into the variable block 112 for realizing the firmware variable updating process. As shown in FIG. 4, the invention can reconstruct an update variable file, i.e. the variable value of the variable 4 is two and the variable value of the variable 5 is one. Moreover, via the procedure 20 shown in FIG. 2, the update variable file can be written into the variable block 112 for replacing the original variable file so as to achieve the firmware variable updating process.

Note that, the computer system 10 shown in FIG. 1 represents an exemplary embodiment of the invention and those skilled in the art can make alterations and modifications accordingly. For example, the BIOS of the computer system 10 can be a BIOS corresponding to a unified extensible firmware interface (UEFI), and this should not be a limitation of the invention. The computer system 10 can be a hand-held or stationary device capable of accessing the internet, a personal computer, a notebook, a personal digital assistant or any electronic device having BIOS, boot firmware or equivalent device. Besides, the processor 102 may access data stored in the storage devices 104, 106 and the memory 108 via a system chip.

In summary, since the firmware variables of the BIOS cannot be updated during a conventional firmware updating process, the invention stores the update capsule file, the firmware update command and the variable update command into the memory through the SMI signals and further changes the computer system into the S3 sleep mode of the ACPI, so that the memory can retain power for normal operation. After that, the invention updates the original capsule file and the original variable file stored in the storage device according to the firmware update command and the variable update command stored in the memory so as to achieve the purpose of adding or deleting firmware variables according different requirements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A firmware variable update method, for a Basic Input/Output System (BIOS) of a computer system, comprising:
   writing an update capsule file and a firmware update command into a memory according to a first system management interrupt signal and starting to perform a shutdown process, wherein the firmware update command is utilized for indicating performing a capsule file updating process and the shutdown process includes switching the computer system into an off state;
   triggering a second system management interrupt signal and accordingly writing a variable update command into the memory, wherein the variable update command is utilized for indicating performing a firmware variable updating process;
   switching the computer system into a sleep state before the shutdown process is completed and activating a timer;
   performing a first reboot process when the timer expires;
   utilizing the update capsule file to update an original capsule file of the BIOS according to the firmware update command during the first reboot process; and
   performing a second reboot process and utilizing an update variable file to update an original variable file of the BIOS according to the variable update command during the second reboot process.

2. The firmware variable update method of claim 1, wherein the step of writing the update capsule file and the firmware update command into the memory according to the first system management interrupt signal and starting to perform the shutdown process comprises:
   checking whether the update capsule file is a valid firmware file;
   triggering the first system management interrupt signal when the update capsule file is the valid firmware file;
   writing the update capsule file and the firmware update command into the memory according to the first system management interrupt signal; and
   performing the shutdown process.

3. The firmware variable update method of claim 2, further comprising:
   executing an update application program to check whether the update capsule file is the valid firmware file.

4. The firmware variable update method of claim 1, wherein the step of triggering the second system management interrupt signal and accordingly writing the variable update command into the memory comprises:
 triggering the second system management interrupt signal before the shutdown process is completed;
 checking identification information of the BIOS according to the second system management interrupt signal and accordingly determining whether to update firmware variables, so as to generate a determination result; and
 writing the variable update command into the memory when determination result indicates that the firmware variables need to be updated.

5. The firmware variable update method of claim 4, wherein the identification information comprises at least one of version information, a build date and a product type of the BIOS.

6. The firmware variable update method of claim 1, wherein the step of utilizing the update capsule file to update the original capsule file of the BIOS according to the firmware update command during the first reboot process comprises:
 detecting the firmware update command in the memory and setting a boot mode of the BIOS into a update mode according to the firmware update command during a pre-EFI initialization environment phase of the first reboot process;
 loading an update driver during a boot device select phase of the first reboot process; and
 utilizing the update capsule file to update the original capsule file of the BIOS by the update driver.

7. The firmware variable update method of claim 6, wherein the step of utilizing the update capsule file to update the original capsule file of the BIOS by the update driver comprises:
 utilizing the update capsule file to overwrite the original capsule file of the BIOS by the update driver.

8. The firmware variable update method of claim 6, further comprising erasing the firmware update command stored in the memory.

9. The firmware variable update method of claim 1, wherein the step of utilizing the update variable file to update the original variable file of the BIOS according to the variable update command during the second reboot process comprises:
 detecting the variable update command in the memory during the second reboot process; and
 utilizing the update variable file to update the original variable file of the BIOS according to the variable update command.

10. The firmware variable update method of claim 9, further comprising erasing the variable update command stored in the memory.

* * * * *